(12) United States Patent
Ancimer et al.

(10) Patent No.: US 7,325,529 B2
(45) Date of Patent: Feb. 5, 2008

(54) METHOD AND APPARATUS FOR CONTROLLING COMBUSTION QUALITY OF A GASEOUS-FUELLED INTERNAL COMBUSTION ENGINE

(75) Inventors: Richard Ancimer, Vancouver (CA); Konstantin Tanin, Vancouver (CA); Tim Frazier, Columbus, IN (US); Sandeep Munshi, Vancouver (CA)

(73) Assignee: Westport Power Inc., Vancouver, BC (CA)

( * ) Notice: Subject to any disclaimer, the term of this patent is extended or adjusted under 35 U.S.C. 154(b) by 0 days.

(21) Appl. No.: 11/397,250

(22) Filed: Apr. 4, 2006

(65) Prior Publication Data

US 2006/0288979 A1   Dec. 28, 2006

Related U.S. Application Data

(63) Continuation of application No. PCT/CA2004/001768, filed on Sep. 30, 2004.

(30) Foreign Application Priority Data

Oct. 1, 2003   (CA) .................................... 2444163

(51) Int. Cl.
*F02B 3/00*   (2006.01)
*F02M 7/00*   (2006.01)
(52) U.S. Cl. ........................ 123/299; 123/435
(58) Field of Classification Search ................ 123/299, 123/304, 305, 435, 525, 27 GE
See application file for complete search history.

(56) References Cited

U.S. PATENT DOCUMENTS

| | | |
|---|---|---|
| 5,050,566 A | 9/1991 | Distelrath et al. |
| 5,450,829 A | 9/1995 | Beck |
| 6,095,102 A | 8/2000 | Willi et al. |
| 6,161,523 A | 12/2000 | Unland et al. |
| 6,202,601 B1 * | 3/2001 | Ouellette et al. ........ 123/27 GE |

(Continued)

FOREIGN PATENT DOCUMENTS

DE   40 02 228 A1   8/1991

(Continued)

OTHER PUBLICATIONS

Kim et al., "Cepstral Analysis As A Tool for Robust Processing, Deverberation And Detection Of Transients", *Mechanical Systems and Signal Processing*, 1992, pp. 1-15, vol. 6, No. 1.

(Continued)

*Primary Examiner*—John T. Kwon
(74) *Attorney, Agent, or Firm*—McAndrews, Held & Malloy, Ltd.

(57) ABSTRACT

A method and apparatus for controlling to a target heat release rate (HRR) uses an HRR control lever, namely, pilot fuel timing and/or pilot fuel quantity, used in a gaseous-fuelled compression ignition internal combustion engine. The mechanism to control HRR to a target HRR improves engine performance and emissions. A target HRR is determined for a cycle of an engine. An HRR control lever is then used to adjust to the target HRR in consideration of combustion conditions in the engine and the difference between the target HRR and cycle HRR predicted for the cycle by reference to, by way of example, a derived HRR trace from a previous cycle, a pressure trace, a measured property of the exhaust gas directly determined or mapped values provided during calibration allowing for adjustment to a target HRR for the engine. The mapped values can be cross-referenced to engine combustion conditions.

34 Claims, 4 Drawing Sheets

U.S. PATENT DOCUMENTS

| | | | |
|---|---|---|---|
| 6,230,683 B1 * | 5/2001 | zur Loye et al. | 123/435 |
| 6,408,819 B1 | 6/2002 | Mezger et al. | |
| 6,439,192 B1 * | 8/2002 | Ouellette et al. | 123/299 |
| 6,598,468 B2 | 7/2003 | Zur Loye et al. | |
| 6,598,584 B2 | 7/2003 | Beck et al. | |
| 6,688,286 B2 | 2/2004 | Kokubo et al. | |
| 6,840,218 B2 | 1/2005 | Scholl et al. | |
| 6,994,077 B2 * | 2/2006 | Kobayashi et al. | 123/568.11 |
| 7,036,482 B2 * | 5/2006 | Beck et al. | 123/229 |
| 2002/0078918 A1 | 6/2002 | Ancimer et al. | |
| 2002/0166515 A1 * | 11/2002 | Ancimer et al. | 123/27 R |
| 2003/0079716 A1 | 5/2003 | Miura | |

FOREIGN PATENT DOCUMENTS

| | | |
|---|---|---|
| DE | 43 41 796 A1 | 9/1995 |
| EP | 1106805 A1 | 6/2001 |
| EP | 1302650 A2 | 4/2003 |
| JP | 02-221664 | 9/1990 |
| WO | WO 91/11602 | 8/1991 |
| WO | WO 95/16196 | 6/1995 |
| WO | WO 03/016698 A1 | 2/2003 |

OTHER PUBLICATIONS

Molinaro et al., "Signal processing pattern classification techniques to improve knock detection in spark ignition engines" (abstract), 1995, INSPEC/IEE, No. XP-002296503 (original published in *Mechanical Systems and Signal Processing*, Jan. 1995).

Li et al. "Failure diagnosis system by sound signal for automobile engine" (abstract), INSPEC/IEE, No. XP-00223612 (original published in *Proceedings of the Japan-USA Symposium on Flexible Automation*, 1996, ASME, New York, NY, USA).

* cited by examiner

METHOD AND APPARATUS FOR CONTROLLING COMBUSTION QUALITY OF A GASEOUS-FUELLED INTERNAL COMBUSTION ENGINE

CROSS-REFERENCE TO RELATED APPLICATION(S)

This application is a continuation of International Application No. PCT/CA2004/001768, having an international filing date of Sep. 30, 2004, entitled "Method And Apparatus For Controlling Combustion Quality Of A Gaseous-Fuelled Internal Combustion Engine". International Application No. PCT/CA2004/001768 claimed priority benefits, in turn, from Canadian Patent Application No. 2,444,163 filed Oct. 1, 2003. International Application No. PCT/CA2004/001768 is hereby incorporated by reference herein in its entirety.

FIELD OF THE INVENTION

This invention relates to a method and apparatus for controlling emissions and engine performance including managing combustion to meet physical limitations of a gaseous-fuelled internal combustion engine.

BACKGROUND OF THE INVENTION

For all their advantages, diesel-fuelled engines have a significant disadvantage. When burned substantially in a diffusion combustion mode, diesel fuel generates high levels of some pollutants. Pollutants such as oxides of nitrogen (NOx) and particulate matter (PM) can be problematic. Cleaner burning gaseous fuels such as natural gas, hydrogen, ethane, propane, blends of gaseous fuels such as blends of natural gas and hydrogen, as well as others tend to expel fewer pollutants than diesel fuel when burned in an internal combustion engine. It has been determined that some gaseous fuels can also provide similar power output when directly injected at high pressure upon completion of a compression stroke or near the commencement of a power stroke in, for example, a four-stroke engine.

While providing emissions benefits, gaseous fuels tend to need some type of ignition assist to initiate combustion when used in an engine with diesel engine compression ratios. One common ignition assist is a pilot fuel. The pilot fuel is used to create an auto-ignitable charge that can be used to help initiate combustion of the gaseous fuel. The gaseous fuel can be directly injected, as noted above, or provided to the combustion chamber as a premixed fuel/air charge prior to combustion of the gaseous fuel. Such pilot ignited engines are considered one type of gaseous-fuelled compression ignition engine.

Gaseous-fuelled compression ignition engines can generally be controlled using engine maps that direct levers to control the start of combustion (SOC) based on the demands of the operator and the speed of the engine. For example, intake charge properties can be monitored and used to adjust SOC to target the release of combustion energy at a time appropriate to the engine speed and the load demands. However, controlling SOC fails to consider many aspects of engine operation important for controlling emissions and performance.

The heat release rate (HRR) seen during combustion of the fuel in a given cycle of the engine is an important determinant driving engine performance and emissions. Use of an ignition lever to control SOC alone fails to manage heat release rate once combustion has started. As such, advantages can be realized when heat release rate is controlled directly. In particular, an engine experiencing changes in the intake charge, which result in significant changes in the HRR, could benefit from a lever to adjust HRR based on a target HRR. This is the case where changes in the intake charge are unforeseen or desired for other purposes.

For example, when exhaust gas recirculation (EGR) is used to reduce NOx emissions significant cylinder-to-cylinder variations in EGR levels are possible, and transient deviations from the desired EGR rates may occur. Under these conditions, the variations in EGR levels can introduce undesirable changes in HRR. The changes in HRR can adversely impact performance of the engine. For example, higher concentrations of other pollutants such as PM and carbon monoxide (CO) may be generated. In general, limitations on EGR levels have been influenced by these undesirable changes in HRR.

Controlling HRR to a target HRR based on EGR levels allows increased levels of EGR and further reduction of NOx emissions while preserving engine performance and other emission targets. Therefore, advantages can be realized by adjusting for the influence of EGR on HRR.

Another example where control of HRR is important in gaseous-fuelled compression ignition engines arises from engines that employ premixed charge combustion ignition (PCCI). This includes engines that take advantage of a directly injected gaseous fuel that burns in a diffusion combustion mode (PCCI-DI) or not (PCCI). PCCI and PCCI-DI engines introduce an intake charge that can vary considerably over short- and long-term periods.

At least a portion of the energy for a PCCI-DI engine is provided by combustion of the premixed charge, which burns with fewer unwanted emissions than is the case for an equivalent amount of fuel burned in a diffusion combustion mode. The drawback, however, of premixing fuel prior to combustion, whether a directly injected quantity of main fuel is used or not, is a charge can be knock limited. That is, a premixed fuel/air charge may knock excessively if the SOC and HRR are not controlled, or the charge may not ignite at all resulting in a misfire. Variations in the intake charge (dictated by such things as methane number of the natural gas and other fuel properties, fuel/air ratio or intake charge temperature, by way of example) can vary considerably over the course of short and long-term periods. For example, a short term variation might be the result of a load transition, where the intake manifold temperature of the PCCI engine might, depending on hardware, take anywhere from 10 to 100 seconds to reach the desired value, by way of example. Long-term variations in intake charge properties may be the result of gaseous fuel composition changes over time, leading to different auto-ignition properties. Under both short term and long term cases, the HRR is strongly influence by the intake charge properties. Therefore, it is helpful to have a mechanism to control the resulting influence of such changes on HRR and thus have better control of engine performance and emissions.

As well as EGR levels and premixed charge properties, other strategies and conditions that influence HRR include the introduction of water into the combustion chamber for controlling emissions, operator demand put on the engine, and variations in ambient temperature, humidity and pressure, all of which benefit from use of a method to adjust to a target HRR.

HRR as both a variable for controlling engine performance and emissions and as an indicator of engine performance and emissions will, for the purposes of this application, be interchangeable with both actual HRR during the cycle of an engine and any variable used that is indicative of the actual HRR resulting from combustion of the fuel used. That is, HRR need not be a reference to an actual HRR trace for a given cycle of an engine. Herein, HRR will includes measures of variables such as cylinder pressure, exhaust gas properties (composition, temperature), intake charge properties (composition, temperature, etc.), and other variables indicative of actual HRR.

In this disclosure, diffusion combustion mode, stratified combustion mode and homogeneous combustion mode are referenced. Each provides an indication of combustion properties consistent with a generally unmixed charge of fuel and air wherein in combustion is thought to take place at the fuel/air interface, a partially mixed charge of fuel and air, and a premixed charge of fuel and air, respectively.

The present technique involves a method of adjusting HRR, both dependent upon and independent of SOC, within a gaseous-fuelled internal combustion engine.

SUMMARY OF THE INVENTION

A method and apparatus control HRR in a gaseous-fuelled compression ignition internal combustion engine. An HRR control lever is used to control HRR based on a target HRR. In general, pilot fuel timing is an important lever for controlling to a target HRR. Depending on the combustion strategy, pilot fuel quantity can also be an important lever. By way of example, where EGR is used to help control NOx emissions, changes within the intake charge resulting from EGR influence HRR which can be compensated for by adjusting pilot fuel timing. The present method and apparatus employ an HRR control lever to adjust HRR based on the difference between the measured HRR (including an HRR indicator) and a targeted HRR (including an HRR indicator). The targeted HRR can be in consideration of changes in the intake charge and/or engine coolant leading up to combustion of a fuel and/or in consideration of the properties of the exhaust gas resulting from combustion of the fuel and/or in consideration of a measure HRR trace or pressure trace correlated to an HRR trace for a cycle of the engine.

The preferred HRR control trigger, pilot fuel timing which can preferably be in conjunction with pilot fuel quantity depending on combustion strategy used for the engine, includes adjustment of timing relative to top dead center (TDC) and relative to gas injection timing where the gaseous fuel is directly injected. Also, pilot fuel quantity alone can be also be used to adjust HRR based on a target HRR.

Accordingly, one aspect of the present method provides for operating a gaseous-fuelled internal combustion engine. The method comprises determining a target HRR for a cycle of the internal combustion engine, and during the cycle of the internal combustion engine:

(i) directing an intake charge into the combustion chamber;

(ii) compressing the intake charge within the combustion chamber;

(iii) introducing at least one gaseous fuel into the combustion chamber;

(iv) introducing a quantity of a pilot fuel into the combustion chamber at a pilot fuel timing, the pilot fuel capable of auto-igniting at a first crank angle when a piston is near or at top dead center within the combustion chamber near completion of a compression stroke during the cycle, the combustion chamber partially defined by the piston;

(v) actuating an HRR control lever to adjust for a difference between HRR for the cycle and the target HRR, the HRR control lever comprising at least one of the pilot fuel timing and the quantity of the pilot fuel; and (vi) burning the gaseous fuel and the pilot fuel, the gaseous fuel ignited as a result of combustion of the pilot fuel.

In a further embodiment of the method, the difference between HRR for the cycle and the target HRR results from changes in engine combustion conditions as compared to previous cycle combustion conditions. The engine combustion conditions and the previous cycle combustion conditions comprise at least one of properties of the intake charge or of the gaseous fuel, humidity in the combustion chamber when the piston is near or at, top dead center, ambient pressure, ambient temperature and ambient humidity.

In a further embodiment the method comprises predicting a cycle HRR that is used to determine the difference between HRR for the cycle and the target HRR. The cycle HRR is also indicative of an HRR trace resulting during a previous cycle of the engine, or a pressure trace generated during a previous cycle of the engine.

In a further embodiment of the present method, the cycle HRR is an HRR trace derived from a controller-processed signal generated during a previous cycle of the engine.

In a further embodiment of method, the cycle HRR is indicative of an exhaust gas property generated during a previous cycle of the engine which may comprise at least one of exhaust gas temperature and exhaust gas composition.

In a further embodiment the method can be practiced wherein gaseous fuel is directly injected into the combustion chamber when the piston is at or near top dead center near completion of the compression stroke during the cycle. The gaseous fuel can also be premixed with the intake charge within an intake manifold prior to ignition of the gaseous fuel.

In a further embodiment, the gaseous fuel is introduced into the combustion chamber in a first stage. It can be introduced during at least a portion of an intake stroke or the compression stroke during the cycle. It can also be introduced in a second stage, which occurs when the piston is at or near top dead center near completion of the compression stroke during the cycle.

In a preferred embodiment, the pilot fuel timing is, during the cycle, prior to 50 crank angle degrees before top dead center during the compression stroke. The HRR control lever may then further comprises the pilot fuel timing and the pilot fuel quantity.

In a further embodiment of method the intake charge comprises exhaust gas generated burning the gaseous fuel and the pilot fuel in a previous cycle of the engine. In another embodiment of method, the HRR control lever is the pilot fuel timing and the pilot fuel timing is adjusted later in the cycle. Here the intake charge comprises a first exhaust gas concentration as compared to a previous cycle with a second exhaust gas concentration. The; first exhaust gas concentration is higher than the second exhaust gas concentration.

In a further embodiment of the present method using EGR, the pilot fuel timing is later in the cycle than a gaseous fuel timing, the gaseous fuel direct injected into the combustion chamber when the piston is at or near top dead center near completion of a compression stroke during the cycle.

In a further embodiment of method, the pilot fuel timing is adjusted later during the cycle where a methane number of the gaseous fuel increases over a previous cycle methane number.

The method can be practiced wherein the gaseous fuel comprises at least one of methane, hydrogen, ethane and propane.

A control apparatus is also provided for controlling HRR in a gaseous-fuelled direct injection internal combustion engine, the control apparatus comprising:
(a) a controller;
(b) at least one sensor for monitoring a signal indicative of HRR during a cycle of the engine, the at least one sensor in communication with the controller;
(c) an HRR control lever in communication with the controller, the controller being capable of adjusting the HRR control lever in response to a difference between the signal and a target signal indicative of a target HRR.

In a preferred embodiment the HRR control lever is at least one of a pilot fuel timing and a pilot fuel quantity. The pilot fuel timing and the pilot fuel quantity are actuated by an injector capable of directly injecting a pilot fuel into a combustion chamber of the engine.

In another embodiment, of the control apparatus the HRR control lever is a pilot fuel timing and a pilot fuel quantity. The pilot fuel timing and the pilot fuel quantity actuated by an injector capable of directly injecting a pilot fuel into a combustion chamber of the engine.

In preferred embodiments of the control apparatus, at least one sensor comprises at least one/any of the following: an accelerometer, in-cylinder pressure sensor, a strain gauge, an ion probe, an exhaust gas temperature sensor or an in-cylinder fiber optic probe.

Further aspects of the invention and features of specific embodiments of the invention are described below.

BRIEF DESCRIPTION OF THE DRAWINGS

In drawings which illustrate non-limiting embodiments of the invention:

FIG. 1a shows an intake stroke of a cycle of the engine. FIG. 1b shows a compression stroke of a cycle of the engine. FIG. 1c shows pilot fuel being directly injected into the combustion chamber at the completion of the combustion event. FIG. 1d shows a power stroke of a cycle of the engine. FIG. 1e shows an exhaust stroke of a cycle of the engine.

DETAILED DESCRIPTION OF PREFERRED EMBODIMENT(S)

The present technique involves a method and apparatus for adjusting to a target HRR for a gaseous-fuelled compression ignition internal combustion engine.

Figure 1:
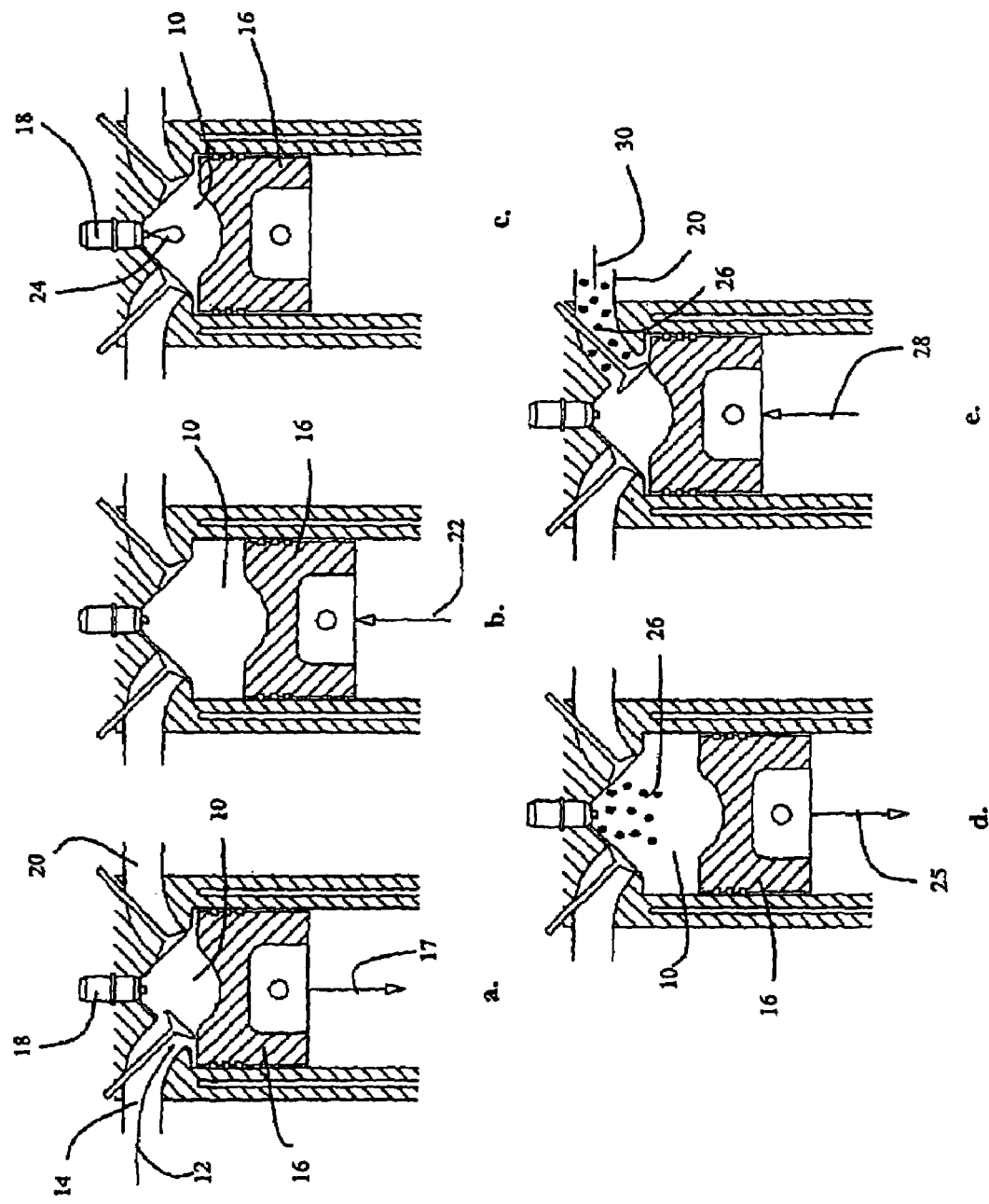
FIG. 1 provides five cross-sectional views of the combustion chamber of a four-stroke gaseous-fuelled compression ignition internal combustion engine.

Referring to FIG. 1, a cross-section providing the stages in a cycle of a typical gaseous-fuelled compression ignition engine is shown. FIG. 1a provides an intake charge introduced into combustion chamber 10 through intake line 14 in direction 12. The intake charge can include any combination of fresh air, EGR, water and gaseous fuel. At the same time, piston 16 is, during the intake stroke, moving in direction 17 away from injector 18, which is disposed in a fire deck and in fluid communication with combustion chamber 10. Also shown is exhaust line 20. FIG. 1b demonstrates piston 16 moving in direction 22 compressing the charge within the combustion chamber during the compression stroke of the engine to a cylinder pressure. Referring to FIG. 1c, pilot fuel 24 can be introduced into combustion chamber 10 when the piston is at or near top dead center. When a premixed main fuel is used, pilot fuel can also be introduced during the intake stroke or early in the compression stroke to provide for a premixed charge by the time the piston is near top dead center. When the pilot fuel is introduced early with a premixed charge of main fuel during the cycle of the engine is preferably introduced between 120 and 50 crank angle degrees prior to top dead center during the compression stroke. Pilot fuel 24 is introduced into combustion chamber 10 from injector 18, which may also be used to directly inject main fuel if desired. For the purposes of this application, injection of fuel near or at top dead center is generally within 30 crank angle degrees on either side of top dead center.

Referring to FIG. 1d, the pilot fuel and any gaseous fuel directly injected or premixed and inducted into the combustion chamber (or both) begins burning near top dead center, as indicated by combustion products 26, thereby driving piston 16 in direction 25. The gaseous fuel (either directly injected when the piston is near top dead center-not shown-or introduced early in the cycle to provide for a premixed charge by the time the piston is near top dead center-also not shown) is ignited when the pilot fuel 24 ignites. The premixed gaseous fuel, if any, can be rich, stoichiometric or lean and can contain EGR.

Pilot fuel 24 can be directly injected into the combustion chamber near top dead center of the compression stroke to result in diffusion combustion (as would be the case in FIG. 1c with the directly injected pilot fuel 24) or partially mixed with the intake charge inside the combustion chamber to result in stratified pilot combustion (as would be the case with early pilot injection) or premixed prior to combustion (as would be the case with very early pilot injection or injection of pilot fuel upstream of the intake valve, not shown) to result in homogeneous pilot combustion.

Finally, the cycle of the engine is completed with the exhaust stroke wherein combustion products 26 are driven from the combustion chamber into exhaust line 20 in direction 30 by action of piston 16 moving in direction 28.

Figure 2:
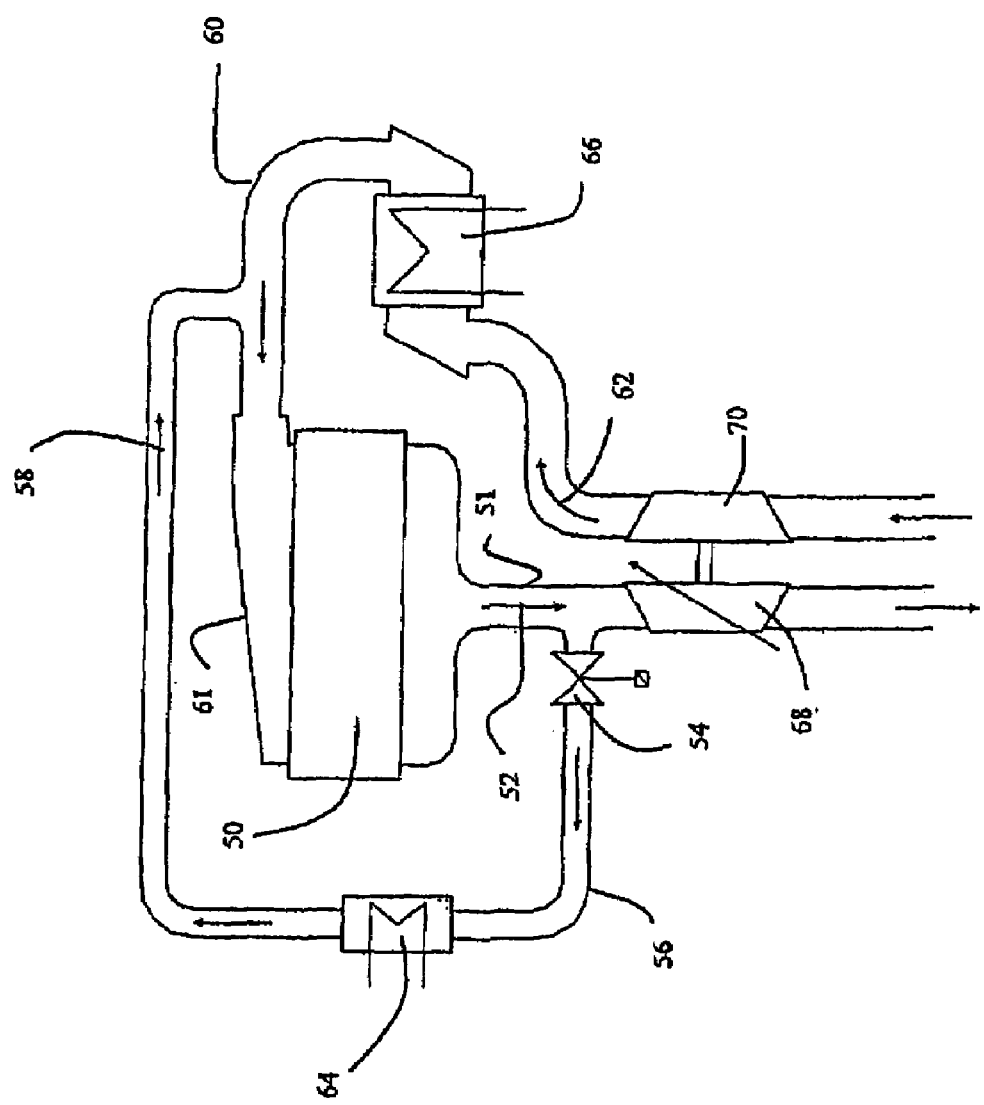
FIG. 2 is a schematic of an exhaust gas recirculation system for a gaseous-fuelled compression ignition internal combustion engine.

Referring to FIG. 2, a typical EGR system is shown wherein engine block 50 housing one or more combustion chambers expels exhaust gas in direction 52 through line 51. Some exhaust gas is then directed through valve 54 into line 56 in direction 58 where it is mixed in line 61 with intake air directed through line 60 in direction 62. Line 61 directs the intake air/EGR charge to engine block 50. Coolers 64 and 66 can be used in both lines 56 and 60 to cool and increase the density of both the intake air and EGR fraction. Also, variable speed turbine 68 and turbocharger 70 can be incorporated.

Figure 3:
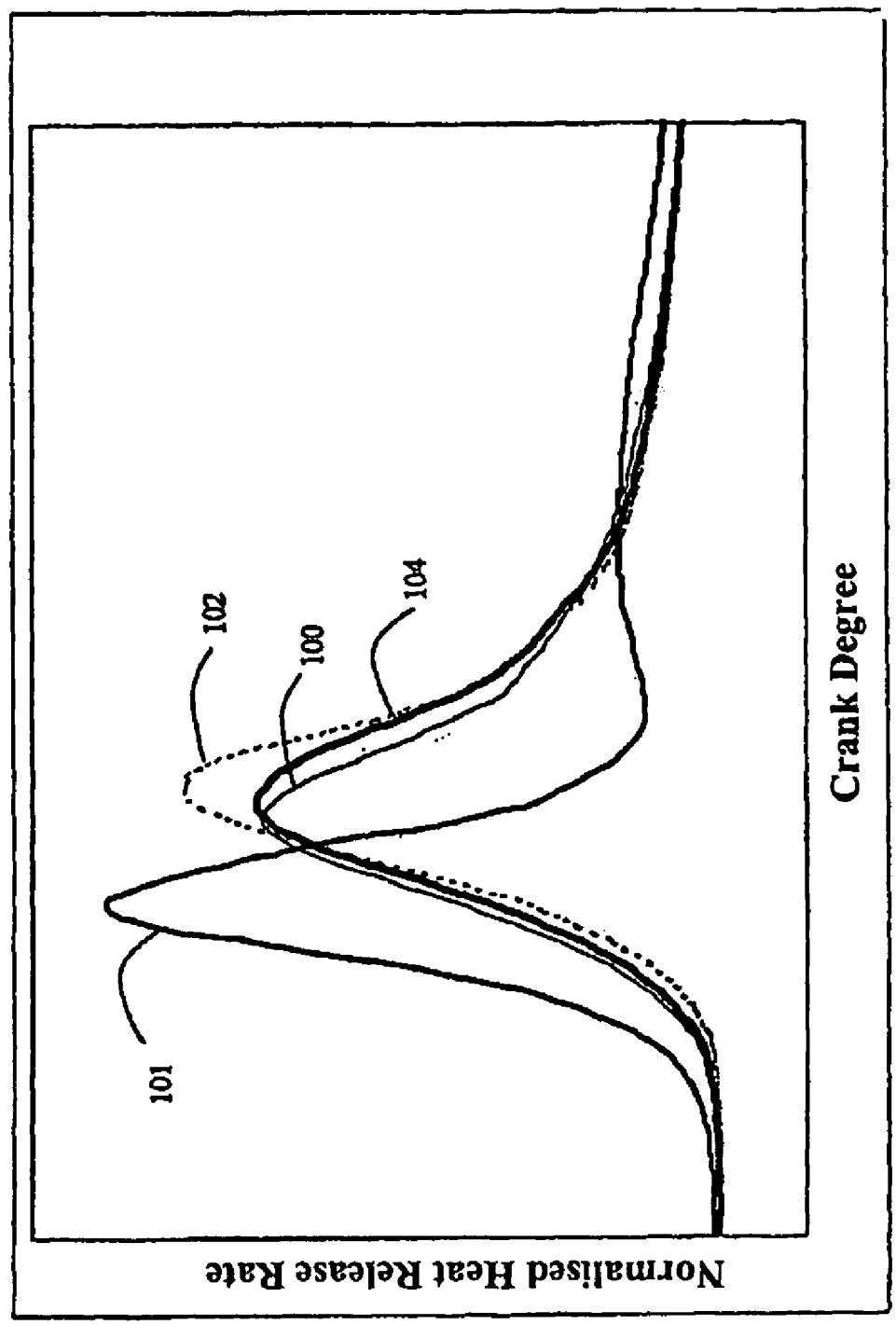
FIG. 3 is a graph of HRR against crank angle, demonstrating the effect of a preferred HRR control lever on changes in the intake charge for a PCCI-DI application.

Referring to FIG. 3, changes in HRR with an example change in intake charge is shown. This first example is of a pilot fuel injection into the combustion chamber well before the completion of the compression stroke of the engine (90 degrees before TDC). Initially, nominal HRR curve 100 is reflective of an initial pilot fuel timing, $t(P)_{in}$. HRR curve 101 provides HRR after changes have been introduced in the intake charge. In the example provided, the intake charge temperature and the fuel/air ratio are changed as compared to the cycle provided for curve 100—note that the engine used is at least partially fuelled with a premixed gaseous fuel/air charge. Curve 102 shows the HRR for the same cycle where SOC has been adjusted by adjusting, in this case, pilot fuel quantity. Curve 104 shows the HRR for a cycle with the new intake charge temperature and equivalence ratio where pilot fuel timing adjustment, $t(P)_{adj}$, reflects the changes in pilot fuel timing required to manipulate HRR such that the resulting curve 104 is similar to that created by the initial HRR, curve 100, for the initial cycle.

Figure 4:
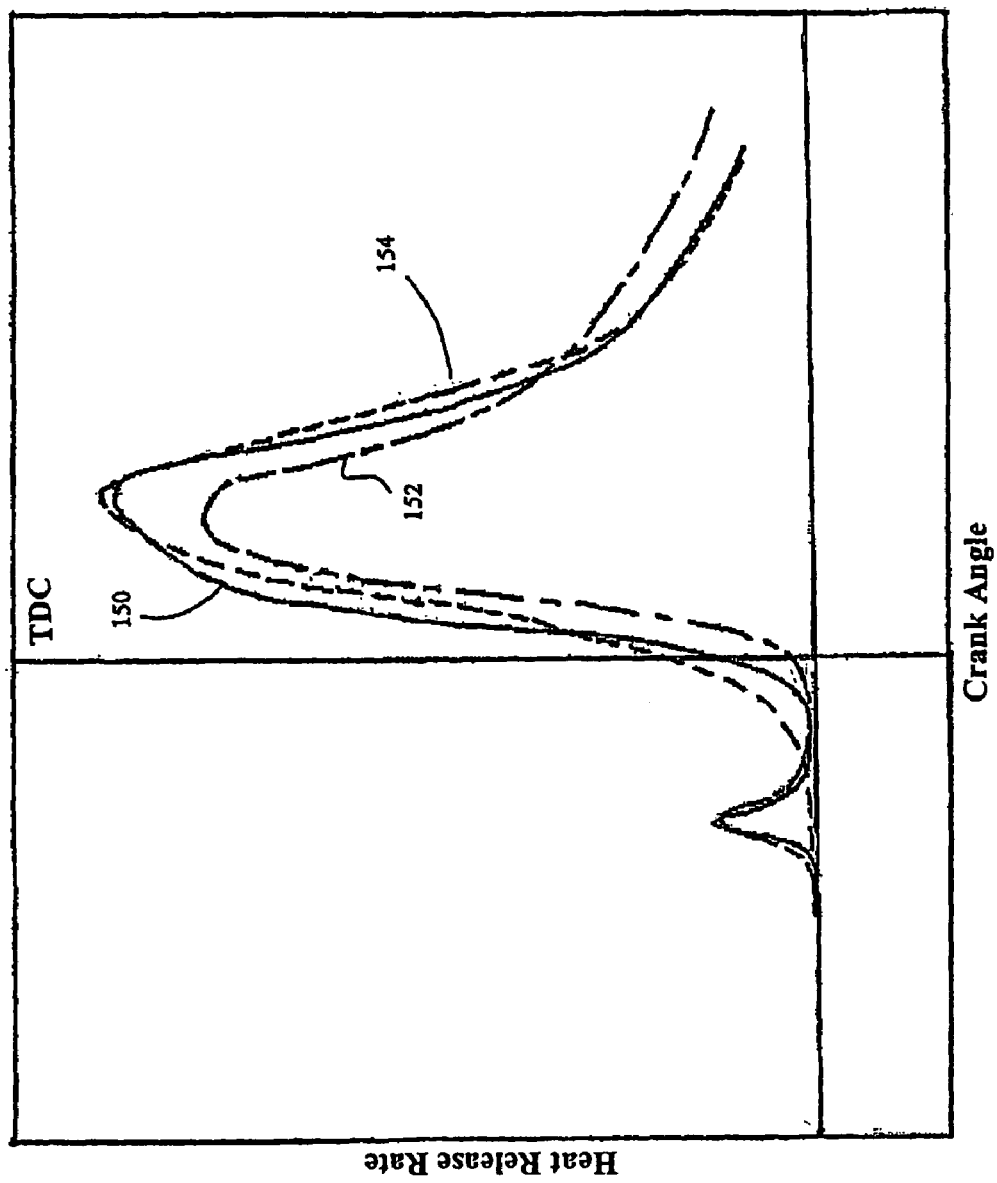
FIG. 4 is a second graph of HRR plotted against crank angle, demonstrating the effect of a preferred HRR control lever on changes in the intake charge for a high EGR directly injected main fuel application.

Note, prior to discussion of the FIG. 4, for the purposes of this application, where pilot fuel timing is manipulated when the injection of pilot fuel is near top dead center (TDC) of the compression stroke, the pilot fuel timing can be expressed as relative to the gaseous fuel injection timing—RIT. RIT is the timing between pilot fuel injection and gaseous fuel injection. That is, an adjustment to timing of injection of pilot fuel is an RIT adjustment as well as adjustment of pilot timing relative to top dead center. Given the proximate timing of main fuel injection and pilot fuel injection, reference to RIT can be more illustrative of the present technique.

Referring to FIG. 4, another example is provided to illustrate the influence of pilot fuel timing on HRR. Here, HRR is plotted against crank angle for a cycle of a gaseous-fuelled direct injection internal combustion engine where changes in the intake charge arise due to the use of EGR. Curve 150 provides a nominal HRR for an intake charge that includes no EGR and associated with desirable engine performance. HRR curve 152 shows the effect of increasing the EGR concentration with no change in pilot fuel timing. Curve 154 results from (a) maintaining the same EGR levels associated with curve 152; and (b) adjusting the relative injection timing (RIT) between the gaseous fuel injection and the pilot fuel injection. The adjustment in this case was to reduce RIT to a negative value (that is, the pilot fuel injection begins after the gaseous fuel injection). The original heat release shape associated with desirable engine performance is recovered.

Pilot fuel timing can adapt HRR based on a target HRR for a wide variety of different intake charge properties or, more generally, combustion conditions with the engine. For example, pilot fuel timing can be used to adapt HRR for variations in:
  fuel/air ratio;
  intake charge temperature,;
  oxygen concentration of the intake charge;
  intake manifold pressure;
  premixed fuel properties;
  ambient humidity, temperature and pressure.;
  operational strategies that include introducing water injection to control NOx.

When the pilot fuel is injected near top dead center, SOC tends to be dictated by injection timing. That is, when a sufficient quantity of pilot fuel is injected near top dead center compression, the elevated temperature of the charge is typically sufficient to drive a short and predictable ignition delay between start of injection and SOC of the pilot fuel. Therefore, pilot fuel timing is generally well correlated with SOC (assuming the gaseous fuel is injected prior to pilot fuel SOC). However, where an early pilot injection strategy is used, the time between introduction of the pilot fuel and ignition of the pilot fuel is more strongly influenced by the quantity of pilot fuel injected into the combustion chamber. Thus, under these circumstances the SOC can be strongly influenced by the quantity of pilot fuel injected.

For the purposes of this disclosure, early pilot fuel timing is considered to be the strategy where pilot fuel is injected early in the compression stroke of a cycle of the engine or during the intake stroke, resulting in a stratified or premixed charge of pilot fuel where pilot fuel quantity has a strong influence on SOC. It would be used where a premixed main fuel charge is used.

As well, pilot fuel quantity adjustments, $q(P)_{adj}$, over an initial pilot fuel quantity, $q(P)_{in}$, can affect HRR to some extent whether injected early in the cycle or when the piston is at or near top dead center. Therefore, when pilot fuel timing is being used to influence HRR, it is important, in some applications, to consider the influence of pilot fuel quantity in light of changes in the intake charge. Preferably, HRR is controlled by considering and adjusting both pilot fuel timing and quantity for the purposes of the present technique. However, pilot fuel timing alone can be used to target an HRR whether the pilot fuel is introduced late in the cycle or early in the cycle, can be used to target an HRR. In principle, pilot fuel quantity can be used to target an HRR as well; however, it is practically effective only when used for early pilot fuel injection controls.

Also, when considering a late pilot fuel injection timing, as is known in the art, the gaseous fuel injection timing can also influence the heat release rate.

Referring to the embodiments, initially in reference to FIG. 3, it can be seen that, as well as the influence on SOC resulting from the adjustment of pilot fuel quantity comparing curves 101 and 102, the HRR is changed somewhat where the peak of the HRR curve is reduced and the duration is increased. The strategy demonstrated in FIG. 3 is for PCCI-DI generally. For a teaching regarding the operation of a PCCI-DI engine, see, by way of example, U.S. Patent Application Publication No. 2002/0078918 A1.

Referring again to FIG. 3, line 104 results from an adjustment in $q(P)_{in}$ as well as $t(P)_{in}$. The results shown in FIG. 3, demonstrate that such an early pilot injection strategy benefits from adjustments to both $q(P)_{in}$ and $t(P)_{in}$ based on the sought target HRR.

Next, referring to FIG. 2, consider the late pilot fuel injection timing example provided using the present technique. Here valve 54 and EGR cooler 64 can be used to control the EGR concentration in the intake charge provided through line 61 after mixing air introduced through line 60 with exhaust gas introduced through line 56. In this case, the target EGR concentration, which translates to a target oxygen concentration in the intake charge, can be controlled in part by coolers 64 and 66 and valve 54. As well, the measured oxygen concentration of the intake charge can be used to then adjust pilot fuel timing based on a calibrated correlation between the determined EGR rate and a target HRR.

When an EGR system is used, there can be variations in intake charge properties during a transient event, or from cylinder-to-cylinder. The influence of these variations can be taken into account using the present technique.

For example, referring to FIG. 4, curve 150 provides a nominal HRR for an intake charge that includes no EGR. HRR curve 150 is associated with desirable engine performance. If the same pilot and gaseous fuel injection timings were used as for the nominal condition (that is, curve 150), but the in-cylinder oxygen concentration was reduced with the introduction of EGR, the heat release shape broadens as shown by HRR curve 152 in FIG. 4. Here, high levels of EGR are used. By way of example, EGR levels of 50% of the intake charge are supported.

To recover the nominal heat release shape (curve 150) from curve. 152, the RIT is reduced, in this case to a negative RIT. The effect is to increase the amplitude and shorten the duration of the heat release event. HRR curve 154 results. Comparison of curve 154 to nominal curve 150 indicates that the desired HRR shape can be recovered using RIT adjustments. Thus, if the EGR rates are not controlled to the desired EGR level, or there are significant cylinder-to-cylinder variations (or engine to engine variations, or if the desired EGR levels cannot be reached), the pilot fuel timing can be adjusted to recover the target HRR. This, as noted above and below, translates into high EGR levels with reduced penalty in performance and PM and CO emissions generally seen with high levels of EGR.

The strength of RIT to achieve a target HRR in view of changes in the intake charge properties provides a mechanism to influence emissions and performance. In the case of EGR, demonstrated in FIG. 4, but for the HRR control lever of RIT, EGR levels much past 30% are generally undesirable in gaseous-fuelled direct injection engines. As would be understood by a person skilled in the art, emissions of such things as PM and CO can increase significantly at higher EGR levels. However, this tends to result because the changes in EGR (or oxygen concentration) have influenced the HRR. So, while NOx emissions fall with high EGR levels, the resulting penalty in other emission can provide an upper barrier beyond which higher EGR levels would prove unacceptable. As many gaseous fuels are not prone to generating emissions such as PM, gaseous fuels tolerate high levels of EGR before hitting PM emissions barriers. However, where HRR can be controlled, the EGR concentration can be driven higher still by compensating for any tendency that such changes in the EGR will have on the HRR (and, consequently, on performance and emissions). As demonstrated in FIG. 4, the EGR levels adjusted for by reducing RIT can result in HRR that matches a target HRR thereby helping to prevent any tendency to generate unwanted emissions and unnecessary performance degradation. As would be understood by a person skilled in the art, this method considers adjustments to EGR levels and other controllable properties of the intake charge to manage and meet other desirable properties of combustion in conjunction with targeting a target HRR. This, in general, would result in a control strategy directed at looking up a calibration providing pilot fuel timing or RIT by reference to a table that could be associated a load and speed and a target EGR level.

Using pilot fuel timing (or a combination of pilot fuel timing and pilot fuel quantity or using pilot fuel quantity alone) to control the HRR resulting from combustion during a cycle of a gaseous-fuelled internal combustion engine helps to secure desired combustion quality within the combustion chamber based on a target HRR. In so doing, the release of energy can be suited to the load and speed demands on the engine, an acceptable performance range and emissions considerations. Deviations from a target HRR can result in losses in efficiency where, for example, too much heat is release too quickly which, as well as possibly resulting in an increase in NOx emission, can result in energy loss through excess heat loss to the cylinder walls, or excessive knock, or excessive peak cylinder pressure. Alternatively, incomplete combustion or misfire can occur where HRR deviates from a target HRR. Premature, late, or partial pilot fuel combustion can fail to ignite the main fuel completely or at all, by way of example. As well as being inefficient, deviations from a target HRR can result in excess hydrocarbon emissions and/or CO emissions.

In practice, the engine can benefit from either open loop or closed loop control of HRR. In open loop control, the engine can be calibrated such that $t(P)_{adj}$ (and where appropriate $q(P)_{adj}$ based on a target HRR) is selected according to parameters across the engine operating range that impact HRR as compared to calibrated and mapped values indicative of a target HRR. By way of example, data indicative of intake charge temperature can be used to determine $t(P)_{adj}$ (usually in consideration of engine speed and load) to achieve the target HRR. As well, changes in methane number of the fuel, equivalence ratio of an intake charge and oxygen concentration provide additional examples of measured parameters that can be used to map an engine to adjust for a pilot fuel timing (and/or quantity in some cases), to direct combustion based on a target HRR.

Further, closed loop control of $t(P)_{adj}$ (and $q(P)_{adj}$, if appropriate) can be based on the measured difference between actual HRR—referred to as cycle HRR (or some parameter indicative of HRR) and target HRR for a given cycle (or average of cycles). By way of example, such measured values of HRR include actual HRR, reconstructed HRR from pressure traces or other signals indicative of cylinder pressure in the combustion chamber, or parameters which can measure the progress of HRR such as by monitoring gas temperatures or ions counts. Exhaust gas temperatures will also provide an indication of HRR that, in light of engine operating condition or independent of those conditions, can be used as an indication of HRR. As discussed above in the teachings of the open loop strategy, the target HRR parameter can be calibrated for the engine based on actual HRR measurements or parameters indicative of HRR such as, but not limited to, exhaust gas temperatures and cylinder pressure measurement.

In general, cycle HRR is measured over a previous cycle or cycles for the engine.

Also, closed loop control can include measuring and adjusting timing and/or quantity of pilot fuel based on a targeted intake charge composition where that property is relatively easily controlled and predicted, such as typically is the case for an engine employing an EGR strategy. This could be calibrated or compared directly to HRR indicative readings, actual HRR and emissions properties.

Also, a combination of open and closed loop control can be used, as would be understood by a person skilled in the art.

In general, a target HRR, $HRR(t)_{tar}$ for a given point on the engine map is predetermined. $HRR(t)_{tar}$ is, as mentioned above, a calibrated parameter across the engine map reflecting the desired actual (or indicative) HRR for the current state of the engine (for example, the current engine load and speed). HRR, $HRR(t)_n$, is determined directly or is a value indicative of $HRR(t)_n$ for a cycle of the engine operating at the given point on the engine map noted above. $HRR(t)_n$ can be measured directly, inferred from a measured variable indicative of HRR or provided from a calibrated look-up table cross-referencing values indicative of HRR. The derived or measured values of HRR are compared with the target values of HRR calibrated for the conditions under which the engine is operating and $t(P)_{adj}$ (and $q(P)_{adj}$, if appropriate) is determined in light of the $t(P)_{in}$ (and $q(P)_{in}$, as the case may be) to reduce the difference found. By way of example, the following represents the subject method generally:

$$t(P)_{adj} \approx t(P)_{in} + f_t(HRR_{tar} - HRR(t)_n) \qquad 1$$

and where incorporating pilot fuel quantity as a further control on HRR:

$$q(P)_{adj} \approx q(P)_{in} + f_q(HRR_{tar} - HRR(t)_n) \qquad 2$$

Therefore, in general, for the purposes of this disclosure, determining a target HRR includes but is not limited to an actual HRR trace, a signal measurement or measurements within the combustion chamber indicative of pressure or HRR during combustion of the fuel, a signal measurement or measurements during combustion of the fuel that is indicative of strain or stress on, or vibration of the combustion chamber to the extent that the signals are correlated to HRR, a measurement of a property of the intake charge that, under engine operating conditions, results in a target engine performance and/or emissions influenced by HRR, exhaust gas properties that under engine operating conditions results in a target engine performance and/or emissions that are influenced by HRR, as well as any combination of the above. Whatever is used for determining a target HRR, this is generally compared to a corresponding HRR. For example, if the target HRR is a cylinder pressure trace known to provide the target HRR, the corresponding HRR, also a cylinder pressure trace, is compared to the target HRR and a suitable adjustment is made to pilot fuel timing (or quantity or both).

As noted above, pilot fuel timing can be adjusted both in reference to degrees of crank angle rotation and in reference to a main fuel injection timing or RIT, if any. Adjusting timing of the main fuel injection as a function of degrees of crank angle rotation helps to adjust HRR when pilot fuel timing is adjusted in some circumstances. Generally, however, the preferred method of adjusting pilot fuel timing is that it be adjusted relative to both main fuel timing and as a function of degrees of crank angle rotation.

As would be understood by a person skilled in the art, adjustments to the main gaseous fuel injection time (relative to top dead center compression), in the case where it may exist, will affect SOC and HRR and could be included as a control lever for operation of the engine.

Note, as well, changes in RIT can benefit from an adjustment such that this timing between the pilot fuel and the main fuel is negative. That is, pilot fuel is injected after commencement of the introduction of the main fuel.

Typical pilot fuels include diesel fuel and other high cetane number fuels that more readily auto-ignite under the conditions provided for in combustion chamber 10.

While the above embodiments are discussed in the context of a four-stroke engine, the embodiment can be adapted to two-stroke engines or rotary engines. Any reference to intake event, compression event, power event and exhaust event, encompasses a rotary engine and four-stroke engines.

While particular elements, embodiments and applications of the present invention have been shown and described, it will be understood, of course, that the invention is not limited thereto since modifications may be made by those skilled in the art without departing from the scope of the present disclosure, particularly in light of the foregoing teachings.

What is claimed is:

1. A method of operating a gaseous-fuelled internal combustion engine, said method comprising:

(a) determining a target heat release rate (HRR) for a current cycle of said internal combustion engine;
   (b) comparing characteristics of said target HRR to selected characteristics of a trace indicative of an actual HRR for said cycle determined from a previous cycle of said internal combustion engine;
   (c) during said cycle of said internal combustion engine:
      (i) directing an intake charge into said combustion chamber defined in said engine;
      (ii) compressing said intake charge within said combustion chamber;
      (iii) introducing at least one gaseous fuel into said combustion chamber;
      (iv) introducing a quantity of a pilot fuel into said combustion chamber at a pilot fuel timing, said pilot fuel capable of auto-igniting at a first crank angle when a piston is near or at top dead center within said combustion chamber near completion of a compression stroke during said cycle, said combustion chamber partially defined by said piston;
      (v) actuating an HRR control lever to reduce differences between said characteristics of said trace and said characteristics of said target HRR, said HRR control lever comprising at least one of said pilot fuel timing and said quantity of said pilot fuel;
      (vi) burning said gaseous fuel and said pilot fuel, said gaseous fuel ignited as a result of combustion of said pilot fuel.

2. The method of claim 1, wherein said characteristics of said trace and said characteristics of said target HRR comprise at least one of:

(a) trace phasing;
   (b) absolute trace magnitude;
   (c) ratio of trace peak to peak trough;
   (d) ratio of trace peak to trace width;
   (e) trace width.

3. The method of claim 1, wherein said trace is a controller-processed trace.

4. The method of claim 3, wherein said trace is determined from a pressure trace.

5. The method of claim 3, wherein said trace is determined from an exhaust gas property.

6. The method of claim 5, wherein said exhaust gas property comprises at least one of exhaust gas temperature and exhaust gas composition.

7. The method of claim 1, wherein said gaseous fuel is directly injected into said combustion chamber.

8. The method of claim 7, wherein said gaseous fuel is directly injected into said combustion chamber when said piston is at or near top dead center near completion of said compression stroke during said cycle.

9. The method of claim 8, wherein said gaseous fuel is premixed with said intake charge within an intake manifold prior to ignition of said gaseous fuel.

10. The method of claim 1, wherein said gaseous fuel is introduced into said combustion chamber in a first stage and a second stage.

11. The method of claim 10, wherein said first stage is introduced during at least a portion of one of an intake stroke and said compression stroke during said cycle, said second stage is when said piston is at or near top dead center near completion of said compression stroke.

12. The method of claim 11, wherein said pilot fuel timing is, during said cycle, prior to 50 crank angle degrees before top dead center during said compression stroke.

13. The method of claim 12, wherein said HRR control lever comprises said pilot fuel timing and said pilot fuel quantity.

14. The method of claim 1, wherein said intake charge comprises exhaust gas generated during burning of said gaseous fuel and said pilot fuel in a previous cycle of said engine.

15. The method of claim 1, wherein said pilot fuel timing is later in said cycle than a gaseous fuel timing, said gaseous fuel direct injected into said combustion chamber when said piston is at or near top dead center near completion of a compression stroke during said cycle.

16. The method of claim 1, wherein said pilot fuel timing is adjusted later during said cycle where a methane number of said gaseous fuel increases over a previous cycle methane number.

17. The method of claim 1, wherein said gaseous fuel comprises at least one of methane, hydrogen, ethane and propane.

18. The method of claim 1, wherein timing for introducing said at least one gaseous fuel is one of said HRR control levers.

19. The method of claim 1 further comprising adjusting said pilot fuel timing relative to timing for introducing said at least one gaseous fuel as one of said HRR control levers.

20. The method of claim 19 further comprising operating said engine with EGR levels greater than 30% by mass of said intake charge.

21. The method of claim 19 further comprising operating said engine with EGR levels up to 50% by mass of said intake charge.

22. A control apparatus for controlling heat release rate (HRR) in a gaseous-fuelled direct injection internal combustion engine, said control apparatus comprising:
    (a) a controller;
    (b) at least one sensor for monitoring a signal, said at least one sensor in communication with a controller capable of processing said signal to provide a trace indicative of an actual HRR;
    (c) an HRR control lever, in communication with said controller, said controller capable of adjusting said HRR control lever in response to a difference between said trace and a target HRR.

23. The control apparatus of claim 22, wherein said HRR control lever is at least one of a pilot fuel timing and a pilot fuel quantity, said pilot fuel timing and said pilot fuel quantity actuated by an injector capable of directly injecting a pilot fuel into a combustion chamber of said engine.

24. The control apparatus of claim 22, wherein said HRR control lever is a pilot fuel timing and a pilot fuel quantity, said pilot fuel timing and said pilot fuel quantity actuated by an injector capable of directly injecting a pilot fuel into a combustion chamber of said engine.

25. The control apparatus of claim 22, wherein said at least one sensor comprises an accelerometer.

26. The control apparatus of claim 22, wherein said at least one sensor comprises an in-cylinder pressure sensor.

27. The control apparatus of claim 22, wherein said at least one sensor comprises a strain gauge.

28. The control apparatus of claim 22, wherein said at least one sensor comprises an ion probe.

29. The control apparatus of claim 22, wherein said at least one sensor comprises an exhaust gas temperature sensor.

30. The control apparatus of claim 22, wherein said at least one sensor comprises an in-cylinder fiber optic probe.

31. The control apparatus of claim 22, wherein said controller is programmed to adjust timing for introducing gaseous fuel as one of said HRR control levers.

32. The control apparatus of claim 22, wherein said controller is programmed to adjust pilot fuel timing relative to timing for introducing gaseous fuel as one of said HRR control levers.

33. The control apparatus of claim 32, wherein said controller is programmed to command a valve that regulates mass flow of EGR to operate said engine with EGR levels greater than 30% by mass of said intake charge.

34. The control apparatus of claim 32, wherein said controller is programmed to command a valve that regulates mass flow of EGR to operate said engine with EGR levels up to 50% by mass of said intake charge.

* * * * *